UNITED STATES PATENT OFFICE.

CLARENCE G. DERICK, WALTER M. RALPH, AND LAWRENCE H. FLETT, OF BUFFALO, NEW YORK, ASSIGNORS TO NATIONAL ANILINE & CHEMICAL CO., INC., OF NEW YORK, N. Y., A CORPORATION OF NEW YORK.

PRODUCTION OF M-NITRO-P-CRESOL.

1,394,150. Specification of Letters Patent. Patented Oct. 18, 1921.

No Drawing. Application filed March 9, 1920. Serial No. 364,427.

*To all whom it may concern:*

Be it known that we, CLARENCE G. DERICK, WALTER M. RALPH, and LAWRENCE H. FLETT, citizens of the United States, residing at Buffalo, county of Erie, State of New York, have invented certain new and useful Improvements in Production of M-Nitro-P-Cresol; and we do hereby declare the following to be a full, clear, and exact description of the invention, such as will enable others skilled in the art to which it appertains to make and use the same.

This invention relates to the production of m-nitro-p-cresol from p-toluidin.

According to the present invention, the p-toluidin is dissolved in sulfuric acid and subjected to diazotization to produce the diazonium sulfate, which is then heated in admixture with an excess of nitrous acid and of nitrating agent to decompose the diazonium sulfate and effect the nitration, with resulting production of the nitrocresol, which is then separated and recovered in a purified state.

The invention will be further illustrated by the following specific examples, the parts being by weight:

265 parts of sulfuric acid (66° Bé.) are added to 400 parts of water in a wooden vat equipped with an agitator, and 107 parts of p-toluidin (100%) are dissolved in the hot solution thus produced. 1100 parts of ice are then added, or an equivalent amount of water is added and the solution is cooled by brine coils or other cooling means, and the cold solution thus produced is subjected to diazotization by the addition of 76 parts of sodium nitrite. It is desirable to add the nitrite in solution of convenient strength, in which case the water used for the solution can be deducted from the weight of ice or water added. The amount of sodium nitrite is in excess of that required for the diazotization, so that an excess of nitrous acid is present during the subsequent decomposition and nitration. The excess of nitrous acid should be sufficient to give a good reaction with starch-iodid paper. 114 parts of sodium nitrate are stirred into the diazotized solution, and after standing for a short time (*e. g.*, about 15 minutes) a small portion of the mixture is run into a decomposition vat where it is heated to a temperature of about 65° C., at which temperature decomposition of the diazonium sulfate is rapid, and nitration likewise takes place. The balance of the cold diazo solution is then run in at such a rate that the temperature is maintained at about 65° C., this temperature being maintained by means of steam coils or other heating means until the heat of reaction becomes sufficient, after which cooling by brine coils may be necessary or advantageous to neutralize the excess heat of reaction. The solution is subjected to suitable agitation to promote uniformity of temperature and of decomposition. When all the solution is run in, the heat of the reaction will keep the temperature up for some time, but it will usually be necessary to use steam again to maintain the temperature at about 65° C. The time required for complete decomposition and nitration varies somewhat but is ordinarily less than 2 hours, where the amount of materials handled is not too great. The reaction is finished when the solution no longer gives a color with an alkaline aqueous solution of R-salt (2-naphthol-3.6-disulfonic-acid sodium salt).

In the decomposition of the diazo compound, the temperature can vary somewhat and good results still be obtained, but for best results it should be kept around 65° C. The reaction takes place more slowly at lower temperatures, while at higher temperatures (*e. g.* 75° and above) the reaction proceeds rapidly and is difficult to control, besides giving somewhat inferior yields. In practice, it is advisable to heat to between 55 and 70° C. and maintain the temperature as nearly as possible around 65° C. until near the end of the reaction when the temperature can advantageously be raised to between 70 and 80° to complete the operation. When the solution shows the absence of the diazo compound, the agitation is stopped and the oil, *i. e.*, the crude nitrocresol, is allowed to settle.

The degree of dilution of the solution during decomposition and nitration is of importance, since with too great dilution the nitration is largely inhibited, or increased amounts of nitric acid or sodium nitrate are required in order to maintain a sufficient concentration of the nitric acid for the nitration; otherwise, if the solution is too dilute and sufficient nitrating agent is not present, part of the p-cresol will escape nitration and will be recovered in the distillate with the nitrocresol. So also, if the solution is too concentrated in sodium nitrate or nitric acid, the control of the reaction becomes more difficult and the product less pure, while the yield of the m-nitro-p-cresol will be decreased and dinitration will tend to take place to an increased degree. Where increased amounts of dinitrocresol are desired, the concentration of the nitric acid can be increased to accomplish this result, but where m-nitro-p-cresol is the product primarily desired, dinitration should be avoided as much as possible by avoiding any considerable excess of the nitrating agent. The concentration above given has been found to give good results in the production of the m-nitro-p-cresol.

As above stated, it is important to have an excess of nitrous acid present during the decomposition and nitration. This excess may vary somewhat, but there should be a sufficient amount of nitrous acid to give a strong starch-iodid test, while the amount should not be in excess of that which is sufficient to form a saturated solution. If excess of nitrous acid is not present, that is, if only the theoretical amount of sodium nitrite for the diazotization is used, the decomposition and nitration is at first delayed, and then suddenly begins and proceeds with explosive violence. This explosive character of the reaction is avoided by the use of an excess of nitrous acid which apparently acts as a catalyst in the reaction. The investigations of the process that have been made indicate that the conversion of the diazotized p-toluidin to the m-nitro-p-cresol in the decomposition vat takes place in several stages, as follows: (1) conversion of the diazotized-p-toluidin to p-cresol; (2) conversion of the p-cresol to m-nitroso-p-cresol, through the agency of free nitrous acid; and (3) oxidation of the m-nitroso-p-cresol to m-nitro-p-cresol. The nitrous acid apparently behaves like a catalyst in the formation of the intermediate nitroso compound, and it is for this reason, as we believe, that the presence of the nitrous acid avoids the danger of explosions which take place if the excess of nitrous acid is not used. It will be understood that this excess of nitrous acid is likewise accompanied by the presence of the proper amount of nitric acid, so that an excess of both nitrous and nitric acids is present.

At the end of the decomposition and nitration, the crude m-nitro-p-cresol, which is an oil, is allowed to settle, and is drawn off from the supernatant mother liquor into a small vat where any mineral acidity is neutralized with soda ash, using methyl orange as indicator. The oil is then drawn off and subjected to steam distillation, the m-nitro-p-cresol passing over into the distillate, leaving behind a residue consisting mainly of tar and dinitrocresol. If the proper amount of nitrating agent is present, as above described, the m-nitro-p-cresol should be substantially free from unnitrated p-cresol. The residue may be further treated for the recovery of the dinitrocresol therefrom. The dinitrocresol present in the mother liquors from the decomposition vat may similarly be recovered therefrom by crystallization and filtration.

The mother liquor or spent acid (from which the m-nitro-p-cresol oil has been drawn off) can be used with advantage in the further carrying on of the process; that is, a portion of this mother liquor can be used to take the place of an equivalent amount of water and sulfuric acid of the original charge. This mother liquor will assist in eliminating the danger of explosion, owing to the excess nitrous acid which it contains. It also contains a small amount of mononitrocresol, as well as some dinitrocresol.

Where dinitrocresol, instead of the mononitrocresol, is desired as the main product of the reaction, the strength and amount of nitric acid can be increased, to increase the amount of dinitrocresol formed. For the production of the mononitrocresol, however, such an excess of acid is undesirable, as above pointed out.

In the specific process above described, the sodium nitrate is added to the solution after the addition of the sodium nitrite. In practice, this order can be advantageously reversed, and the sodium nitrate added to the solution before the sodium nitrite, so that any cresol formed during the diazotization or soon thereafter is subjected to the nitrating action of the nitrating agent as soon as it is formed. The following specific description will further illustrate the process of the invention when carried out in this way; the parts are by weight:

293 parts of sulfuric acid (66° Be'.) are added to 400 parts of water in a diazotizing vat, and 107 parts of p-toluidin added. The heat of dilution of the sulfuric acid furnishes the heat required to dissolve the toluidin and give a clear solution. 1100 parts of water are then added and the whole solution is cooled with brine to about 10° C., when 125 parts of solid sodium nitrate and 76 parts of solid sodium nitrite are added. The solution should then be at about 15 to 20° C., and should give a strong test for nitrous acid with starch-iodid paper.

In another vat, 162 parts of p-toluidin are added to 750 parts of spent acid or mother liquor from the previous run, 370 parts of 66° Bé. sulfuric acid are run in, giving a clear solution. 1000 parts of water are now run in and the whole cooled with brine to about 10° C. 160 parts of sodium nitrate are then added and 114 parts of sodium nitrite in 500 parts of water are then run in. The resulting diazotized solution is then heated to 55 to 70° C., and the temperature kept constant by running in the cold solution above described (in the preceding paragraph). When this cold diazo solution is all run in, the temperature is raised to 70 to 80° C., and this temperature maintained until the solution no longer gives a color with R-salt as above described, when the agitation which has been kept up during the decomposition and nitration is stopped, and the oil, that is, the m-nitro-p-cresol, is permitted to settle. This oil is then drawn off from the decomposition vat, water added, the mixture agitated and soda ash added until there is only a faint test with methyl orange. The oil, which is the crude m-nitro-p-cresol, is then distilled, for example, by the use of a mixture of high and low pressure steam, and the warm distillate of m-nitro-p-cresol collected in a suitable receptacle therefor.

The specific process above described, can be somewhat varied, as will be readily understood. For example, 66° Bé. sulfuric acid may be used in somewhat smaller amount, e. g., 290 parts. So also, the sodium nitrite can be used in the form of a 25% solution, and gradually added, a correspondingly less amount of water being previously used. In neutralizing any excess acidity of the crude oil, the gravity of the aqueous solution should be kept less than that of the oil, so that the oil can be drawn off from the supernatant aqueous liquor.

By proceeding in the manner above described, the m-nitro-p-cresol can be obtained in a sufficiently pure state for shipment or use, and can also be obtained with good yields, and with the formation of relatively small amounts of the dinitrocresol and other products.

From the above description it will be seen that the p-toluidin is diazotized in the presence of sulfuric acid, with resulting production of the diazonium sulfate; and that the diazo compound is then subjected to decomposition and nitration by the addition of sodium nitrate and sodium nitrite in sufficient amount so that there is an excess of both nitrous acid and nitric acid during the decomposition and nitration. It will also be seen that the decomposition and nitration is effected under regulated temperature conditions and with such a concentration of the nitrating agent that the m-nitro-p-cresol is obtained as the main product of the reaction. The process can also be carried out with advantage by making use of a part of the spent acid or mother liquor in the further carrying out of the process.

We claim:

1. The method of diazotizing p-toluidin, which comprises dissolving about 107 parts of p-toluidin in about 265 to 290 parts of sulfuric acid (66° Bé.), diluted with about 400 parts of water, whereby the heat of dilution of the sulfuric acid is utilized in dissolving the p-toluidin, adding about 1100 parts of water thereto, cooling the resulting solution, and adding sodium nitrite.

2. The method of producing m-nitro-p-cresol, which comprises dissolving p-toluidin in sulfuric acid and diazotizing the same by the addition of an excess of sodium nitrite to the cold solution, and heating the resulting solution with the addition of sodium nitrate to a regulated temperature of about 55 to 70° C. to effect the decomposition of the diazonium sulfate and the nitration of the cresol.

3. The method of producing m-nitro-p-cresol, which comprises diazotizing p-toluidin in the presence of sulfuric acid, and heating the resulting solution with an excess of nitrous acid and of nitrating agent to a regulated temperature to effect decomposition of the diazonium sulfate and nitration of the cresol.

4. The method of producing m-nitro-p-cresol which comprises heating a sulfuric acid solution of diazotized p-toluidin in the presence of a nitrating agent and an excess of nitrous acid to a temperature of about 55 to 70° C.

5. The process of producing m-nitro-p-cresol, which comprises adding sodium nitrate to a cold dilute sulfuric acid solution of diazotized p-toluidin sulfate in which an excess of nitrous acid is present, and gradually decomposing the resulting solution and effecting nitration by heating the same to a temperature of about 65° C.

6. The method of producing m-nitro-p-cresol, which comprises subjecting a solution of diazotized p-toluidin sulfate in dilute sulfuric acid containing an excess of nitrous acid and of nitrating agent to decomposition and nitration by heating the same to a temperature of about 55 to 70° C. to bring about the decomposition and nitration.

7. The method of producing m-nitro-p-cresol, which comprises gradually adding a solution of diazotized p-toluidin, which solution contains an excess of nitrous acid and of nitrating agent, to a decomposing vessel maintained at a temperature of about 65° C., and maintaining the temperature at about 65° C. until the decomposition and nitration is completed.

8. The method of producing dinitrocresol, which comprises subjecting a dilute sulfuric acid solution of diazotized p-toluidin to decomposition and nitration in the presence of an excess of nitrous acid and of nitrating agent, and separating the dinitrocresol from the reaction product.

9. The method of producing m-nitro-p-cresol, which comprises heating a solution of diazotized p-toluidin, containing an excess of nitrous acid and of nitrating agent, to a temperature of about 55 to 70° C. to bring about the decomposition and nitration, separating the m-nitro-p-cresol from the spent acid or mother liquor and using the spent acid or mother liquor in making a solution of a further amount of diazotized p-toluidin in the further carrying out of the process.

10. The method of producing m-nitro-p-cresol, which comprises adding sodium nitrate to a cold sulfuric acid solution of p-toluidin, adding sodium nitrite to the solution to effect diazotization of the p-toluidin together with an excess of sodium nitrite, and heating the solution after diazotization to a temperature of about 55 to 70° C. to bring about the decomposition of the diazonium sulfate and the formation of m-nitro-p-cresol.

11. The method of producing m-nitro-p-cresol, which comprises adding to a solution of p-toluidin an excess of sodium nitrate and of sodium nitrite for the diazotization and nitration, effecting the diazotization of the p-toluidin in a cold solution, and heating the solution containing an excess of nitrous acid after diazotization to a temperature of about 55 to 70° C. to bring about the decomposition and nitration.

12. The method of producing m-nitro-p-cresol which comprises dissolving about 107 parts of p-toluidin in about 265 to 290 parts of sulfuric acid (66° Bé.) diluted with about 400 parts of water, whereby the heat of dilution of the sulfuric acid is utilized in dissolving the p-toluidin, adding about 1,100 parts of water thereto, cooling the resulting solution, adding about 76 parts of sodium nitrite and about 114 parts of sodium nitrate, and heating the resulting mixture to a regulated temperature of about 55 to 70° C. to effect the decomposition of the diazonium sulfate and the formation of m-nitro-p-cresol.

In testimony whereof, we affix our signatures.

CLARENCE G. DERICK.
WALTER M. RALPH.
LAWRENCE H. FLETT.